2,960,395
Patented Nov. 15, 1960

2,960,395
METHOD FOR CONTROL OF PLANT GROWTH

Johannes Thomas Hackmann and Pieter Ten Haken, Herne Bay, England, assignors to Shell Oil Company, a corporation of Delaware No Drawing. Filed July 19, 1957, Ser. No. 672,865

Claims priority, application Great Britain July 20, 1956

2 Claims. (Cl. 71—2.5)

This invention pertains to novel compositions useful as fungicides, herbicides and growth stimulants. More particularly the present invention pertains to novel compositions containing dihydro-oxazolone derivatives as an active component, and to the employment of these novel compositions to effectively control the growth processes of vegetation. Some novel compositions of the present invention are most valuable when employed as growth stimulants for fungi, other compositions of the present invention are most valuable when employed as fungicides and still other compositions of the present invention are most valuable when employed as herbicides.

The novel compositions of the invention comprise as the essential ingredient a dihydro-oxazolone derivative of the general formula:

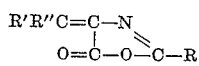

wherein R may represent hydrogen, an aliphatic group of 1 to 10 carbon atoms (preferably methyl) or an aromatic group such as benzyl, tolyl, phenyl, naphthyl, or anthryl. Of these aromatic groups phenyl is preferred. These aromatic and aliphatic groups, if desired, may have substituted thereon groups such as halogen (preferably chlorine), nitro or hydroxyl groups. R may also represent an aralkyl group wherein the aromatic portion is as defined above and the alkyl portion preferably contains 1 to 10 carbon atoms.

R' may represent hydrogen, an aliphatic group of 1 to 10 carbon atoms, an aromatic group such as benzyl, tolyl, naphthyl, or anthryl or a heterocyclic group containing oxygen, nitrogen or sulfur atoms such as the pyridyl, quinolyl, furyl, pyrrolyl, thienyl and thiazolyl groups. R' may represent an aralkyl group wherein the aromatic portion is as defined above and the alkyl portion preferably contains 1 to 10 carbon atoms. R' may, if desired, carry one or more nuclear substituents such as halogen (preferably chlorine) hydroxyl or nitro groups. R" may be hydrogen or alternatively R' and R" may form a heterocyclic group such as the oxygen containing radical phthalidene or one of the heterocyclic groups described above.

Examples of specific compounds encompassed by the present invention are:
2-methyl-4-benzylidene - oxazol - 5 - one, 2 - phenyl-4-(2-furylidene) - oxazol - 5 - one, 2 - phenyl - 4 - benzylidene - oxazol - 5 - one, 2 - phenyl - 4 - (α - naphthyl) methylene - oxazol - 5 - one, 2 - phenyl-4-(9-anthranyl) methylene-oxazol-5-one, 2 - phenyl-4-(phthalidylidene) oxazol-5-one, 2-methyl-4-(phthalidylidene)oxazol-5-one, 2-methyl-4-(naphthylmethylene)oxazol-5-one, 2 - phenyl-4-(thenylidene)-oxazol-5-one, 2 - phenyl-4-(cinnamylidene)oxazol-5-one, 2 - decyl - 4 - (p-tolyl)methylene-oxazol-5-one, 2 - benzyl - 4 - pyridylidene - oxazol-5-one, 2-p-tolyl-4-(3-quinolyl)methylene-oxazol - 5 - one, 2 - naphthyl-4-(3-pyrolyl)methylene - oxazol - 5 - one, 2-anthracenyl - 4 - (4 - thiazolyl)methylene - oxazol-5- one, 2-butenyl-4-benzylidene - oxazol - 5 - one, 2-decenyl-4-benzylidene-oxazol-5-one.

Generally speaking the above dihydro-oxazolone derivatives are prepared by condensing a compound containing a reactive carbonyl group with an acylglycine in the presence of acetic anhydride and anhydrous sodium acetate. The reaction may be represented by the general formula:

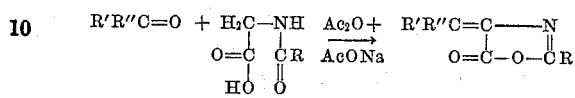

wherein R, R' and R" have the aforesaid significations.

More particularly the 2-methyl-4-benzylidene oxazol-5-one may be made in accordance with the following procedure:

A mixture of 58.5 g. (0.5 mole) of acetylglycine, 30 g. (0.39 mole) of anhydrous sodium acetate, 79 g. (0.74 mole) of freshly distilled benzaldehyde, and 134 g. (1.25 moles) of 95% acetic anhydride in an Erlenmeyer flask is warmed on a steam bath with occasional stirring until solution is complete. The resulting solution is boiled for one hour under reflux, cooled and placed in a refrigerator overnight. The solid mass of yellow crystals is treated with 125 cc. of cold water and broken up with a stirring rod, washed and dried. The product melts at about 148–151°. This preparation follows the description appearing in Organic Synthesis, Collective Volume II, page 1.

Some dihydro-oxazolone derivatives encompassed by the present invention exhibit high fungicidal activity but are relatively inactive as herbicides applied either pre-emergence or post-emergence. They may, however, cause a high percentage inhibition of frond growth of *Lemna minor* in a concentration of 50 parts per million. An example of this type of compound is 2-methyl-4-benzylidene-oxazol-5-one, which is effective at 1250 parts per million against *Alternaria grassicicola* in the spore germination test carried out on wallflower leaves. Moreover, when sprayed as an aqueous suspension containing 0.1% active material on tomato or potato plants, at least 95% control of late blight caused by *Phytophthora infestans* can be obtained. This fungicidal effect is better than that obtained with aqueous suspensions containing, by weight, 0.5% copper oxychloride or 0.1% Captan and equal to that obtained with an aqueous suspension containing 0.1% Zineb. This compound causes 60% inhibition of frond growth of *Lemna minor* but has little herbicidal activity towards land plants. Compounds of this type are consequently of great value as fungicides.

Other dihydro-oxazolone derivatives possess selective activity as herbicides. Thus, 2-phenyl-4-(α-naphthyl)-methylene-oxazol-5-one, when applied in an aqueous dispersion at the rate of 5 pounds per acre to seeds of oats and mustard in sterile sand, produced a 90% reduction in the fresh weight of emerged oat seedlings, but only a 33% reduction in the fresh weight of emerged mustard seedlings, compared with the weight of untreated seedlings. This compound may therefore be used as a pre-emergence weed killer in dicotyledonous crops and for destroying "wild oats" (*Avena* sp.).

2-phenyl-4-(9-anthryl)methylene - oxazol-5-one, when applied in 0.1% by weight concentration in a non-phytotoxic spindle oil to growing seedlings caused a 96% reduction in growth of mustard and a 67% reduction in growth of linseed, compared with untreated seedlings, but was quite inactive towards oat seedlings. It may therefore be used as a selective weed killer in cereal crops.

2-phenyl-4-(2 - furylidene)oxazol-5-one was found to have a marked growth stimulating action in the spore germination test and is therefore of use as a growth stimulant in the cultivation of fungi. This compound also exhibited high selective toxicity to oats when applied pre-emergence. Broadly all of the compositions encompassed by the present invention effect the growth processes of vegetation including fungi.

The fungicidal and herbicidal activities of substituted dihydro-oxazolones encompassed by the present invention are summarized in the following table.

The compositions of the invention may be applied by the dusting and spraying techniques commonly employed in the agricultural industry.

Compositions of the invention to be applied as dusts comprise an intimate mixture of the dihydro-oxazolone derivative with a finely powdered solid carrier such as is commonly used in manufacturing pesticidal dusts for

| Name | Formula | Fungicidal activity, LD 95 | Lomna, 50 p.p.m. | | Pre-emergence, 5 lbs. per acre Percent reduction in fresh weight of emerged seedlings | | Post emergence, 0.1% w./v. Percent reduction in fresh weight (stem leaf) | | | | | |
|---|---|---|---|---|---|---|---|---|---|---|---|---|
| | | | Percent kill of fronds | Percent inhibition of frond growth | Oats | Mustard | Oats | | Mustard | | Linseed | |
| | | | | | | | Oil | Water | Oil | Water | Oil | Water |
| 2-Methyl-4-benzylidene-oxazol-5-one. | | 1,250 | 0 | 60 | 26 | 0 | 0 | 3 | 11 | 0 | 0 | 20 |
| 2-Phenyl-4-(2-furylidene)-oxazol-5-one. | | stimulant | | | 89 | 52 | 6 | 0 | 30 | 0 | 0 | 22 |
| 2-Phenyl-4-benzylidene-oxazol-5-one. | | | | 34 | 18 | 0 | 6 | 0 | 5 | 0 | 63 | 22 |
| 2-Phenyl-4-($\alpha$-naphthyl)methylene-oxazol-5-one. | | | | | 90 | 33 | 0 | 19 | 67 | 5 | 15 | 30 |
| 2-Phenyl-4-(9-anthranyl)methylene-oxazol-5-one. | | | | | 26 | 15 | 0 | 13 | 96 | 17 | 67 | 24 |
| 2-Phenyl-4(phthalidylidene)oxazol-5-one. | | >5,000 | | | 0 | 1 | 2 | 7 | 33 | 56 | 0 | 0 |
| 2-Methyl-4(phthalidylidene)oxazol-5-one. | | >5,000 | | | | | 21 | 0 | | | 8 | 14 |
| 2-Methyl-4(naphthylmethylene)oxazol-5-one | | 5,000 | | | 36 | 26 | 12 | 0 | 17 | 30 | 18 | 8 |

The dihydro-oxazolone derivatives may be formulated in the compositions of the invention with one or more finely divided solid carriers or with liquid carriers. They may be formulated with one or more surface active agents or with both a carrier and a surface active agent. These compositions may be suitable for application as such or may be concentrates which are diluted for application, for example, with relatively large volumes of finely divided solid carriers where a dust is required or with water where an aqueous spray is required. To enable hard water to be used for dilution, the surface active agents employed in the compositions of the invention are preferably of the non-ionic type as, for example, the condensation products of ethylene oxide with oleyl alcohol, abietic acid and p-octylphenol.

agricultural and horticultural use, for example, finely powdered talc, clay, silica, carbon, fuller's earth or kieselguhr. These powder carriers may be oil treated to improve adherence to the plant surface.

Compositions of the invention formulated as wettable powders are very useful. These comprise at least 10% by weight of the dihydrooxazolone derivative, mixed with a finely divided solid carrier as indicated above and a dispersing and/or suspending agent. Other additives may be present, for example, water conditioning agents such as sodium phosphate, sodium polyphosphate or cellulose ethers such as methyl cellulose of the sodium salt of cellulose glycollic acid. These compositions are diluted with water for application.

The dihydro-oxazolone derivatives may also be formulated as wettable powders containing a major proportion of the active compound and a minor proportion of a wetting agent or a suspending agent or both a wetting and suspending agent. These can be diluted with relatively large volumes of water to produce an aqueous solution or suspension suitable for application.

Liquid compositions of the invention comprise a solution or dispersion of the dihydro-oxazolone derivative in an organic liquid which may be applied either as such or after dilution. Non-phytotoxic petroleum spray oils may be used in compounding a composition for fungicidal use. For herbicidal use, less highly refined petroleum oils may be used as kerosine, gas oils and lubricating oils, aromatic extracts obtained by extracting such petroleum fractions with solvents selective for aromatics e.g. liquid sulphur dioxide or furfural, and acylated aromatic extracts. The oil solutions of the dihydro-oxazolone derivatives are suitable for application by low volume spraying, for example, at rates of 5 to 10 gallons per acre.

The compositions of the invention may also be formulated as a concentrated solution or dispersion of the dihydro-oxazolone derivative in an organic liquid, preferably a water-insoluble organic liquid, containing an added wetting or emulsifying agent. These concentrates preferably contain a minor proportion of water, for example, 5 to 10% by volume, based on the total composition, to facilitate subsequent dilution with water. Suitable organic liquids are, for example, the lower aliphatic alcohols and ketones, and hydrocarbon oils such as are specified above. These concentrates may be diluted with relatively large volumes of water for application by high volume spraying. Advantageously, these compositions are formulated with an organic solvent of high volatility and an emulsifier producing on dilution with water, in amount from 4 to 10 times the volume of the concentrate, a water-in-oil type emulsion suitable for application by low volume spraying.

The dihydro-oxazolone derivatives may be used in the compositions of the invention in conjunction with other pesticidal compounds. So called "stickers" may be added to increase adhesion of the compositions to plants.

It is to be understood that though specific components of the present novel compositions have been named, that these components may vary considerably without departing from the scope of the invention.

We claim as our invention:

1. A method for the growth control of plants comprising the steps of contacting said plants with a composition comprising a dihydro-oxazolone derivative having the formula

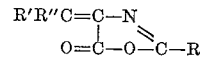

wherein R is chosen from the class consisting of alkyl from 1 to 10 carbon atoms, aralkyl wherein the alkyl moiety contains from 1 to 10 carbon atoms and aryl radicals, R' is chosen from the class consisting of aryl, aralkyl wherein the alkyl moiety contains from 1 to 10 carbon atoms and the heterocyclic radicals, pyridyl, quinolyl, furyl, pyrolyl, thienyl and thiazolyl and R" is a hydrogen atom with the proviso that R' and R" taken together are a heterocyclic radical; in admixture with an agricultural carrier and a surface-active agent therefor, said dihydro-oxazolone derivative being present in said composition in sufficient quantity to effect plant growth when said composition is applied to plants.

2. A method for the growth control of plants comprising the step of contacting said plants with a composition comprising 2-methyl-4-benzylidene-oxazol-5-one in admixture with an agricultural carrier and a surface-active agent therefor, said oxazolone being present in said composition in sufficient quantity to effect plant growth.

References Cited in the file of this patent
UNITED STATES PATENTS

| | | |
|---|---|---|
| 2,478,661 | King | Aug. 9, 1949 |
| 2,844,590 | Cameron | July 22, 1958 |

OTHER REFERENCES

King: "Agriculture Handbook," No. 69, U.S. Dept. of Agriculture, published May 1954, page 250.